US008854462B2

United States Patent
Herbin et al.

(10) Patent No.: US 8,854,462 B2
(45) Date of Patent: Oct. 7, 2014

(54) METHOD OF DETERMINING THE PASSAGE OF A VEHICLE THROUGH A GAP

(75) Inventors: Anne Herbin, Paris (FR); Patrice Reilhac, Esslingen (DE)

(73) Assignee: Valeo Vision, Bobigny (FR)

( * ) Notice: Subject to any disclaimer, the term of this patent is extended or adjusted under 35 U.S.C. 154(b) by 1711 days.

(21) Appl. No.: 11/834,145

(22) Filed: Aug. 6, 2007

(65) Prior Publication Data

US 2008/0049150 A1    Feb. 28, 2008

(30) Foreign Application Priority Data

Aug. 24, 2006  (DE) ......................... 10 2006 041 651
Mar. 16, 2007  (FR) ..................................... 07 01945

(51) Int. Cl.
| | |
|---|---|
| *H04N 7/18* | (2006.01) |
| *H04N 7/00* | (2011.01) |
| *B60Q 1/00* | (2006.01) |
| *B60Q 9/00* | (2006.01) |
| *G08G 1/16* | (2006.01) |

(52) U.S. Cl.
CPC .. *G08G 1/16* (2013.01); *B60Q 9/00* (2013.01); *B60Q 2400/50* (2013.01)
USPC ........... 348/148; 348/115; 340/435; 340/436; 701/301

(58) Field of Classification Search
CPC ......... G08G 1/16; B60Q 9/00; B60Q 2400/50
USPC .......... 348/148, 149, 113–115; 340/435, 436; 701/300, 301
See application file for complete search history.

(56) References Cited

U.S. PATENT DOCUMENTS

| | | | | |
|---|---|---|---|---|
| 5,530,420 | A  * | 6/1996 | Tsuchiya et al. ............... | 340/435 |
| 5,541,590 | A  * | 7/1996 | Nishio .......................... | 340/903 |
| 6,138,062 | A  * | 10/2000 | Usami ............................ | 701/23 |
| 6,285,393 | B1 * | 9/2001 | Shimoura et al. ............. | 348/119 |
| 6,424,895 | B1 * | 7/2002 | Shimizu et al. ................. | 701/41 |
| 6,466,684 | B1 * | 10/2002 | Sasaki et al. .................. | 382/104 |
| 6,477,260 | B1 * | 11/2002 | Shimomura ................... | 382/106 |
| 6,567,726 | B2 | 5/2003 | Sakiyama et al. | |
| 6,947,064 | B1 * | 9/2005 | Hahn et al. ..................... | 701/301 |

(Continued)

FOREIGN PATENT DOCUMENTS

| | | |
|---|---|---|
| DE | 590399 A | 1/1934 |
| DE | 102005062151 A1 | 7/2007 |

(Continued)

OTHER PUBLICATIONS

Caruso, Michael J. et al., "Vehicle Detection and Compass Applications Using AMR Magnetic Sensors," in particular in the sections on AMR Sensor Applications and Vehicle Classification, Honeywell, SSEC, Plymouth, MN, Oct. 18, 2000.

(Continued)

*Primary Examiner* — Rupal Dharia
*Assistant Examiner* — Wing Ma
(74) *Attorney, Agent, or Firm* — Jacox, Meckstroth & Jenkins (57) ABSTRACT

The invention discloses a method of determining the ability of a vehicle to pass through a restricted gap in the roadway, including the steps of: detecting a restricted gap in the roadway, defining an image of the vehicle, and comparing the vehicle image with the restricted gap.

23 Claims, 5 Drawing Sheets

(56) References Cited

U.S. PATENT DOCUMENTS

| | | | |
|---|---|---|---|
| 6,985,075 | B2 | 1/2006 | Takeda |
| 7,058,207 | B2 | 6/2006 | Iida et al. |
| 7,136,754 | B2 | 11/2006 | Hahn et al. |
| 2002/0110262 | A1 | 8/2002 | Iida et al. |
| 2002/0128754 | A1 | 9/2002 | Sakiyama et al. |
| 2003/0069695 | A1* | 4/2003 | Imanishi et al. ............ 701/301 |
| 2003/0147247 | A1* | 8/2003 | Koike ........................ 362/464 |
| 2004/0056950 | A1 | 3/2004 | Takeda |
| 2004/0220724 | A1 | 11/2004 | Hahn et al. |
| 2005/0125121 | A1 | 6/2005 | Isaji et al. |
| 2005/0177283 | A1* | 8/2005 | Lan ............................ 701/1 |
| 2005/0231340 | A1* | 10/2005 | Tauchi ...................... 340/435 |
| 2006/0002587 | A1* | 1/2006 | Takahama et al. .......... 382/103 |
| 2006/0085125 | A1* | 4/2006 | Shibata et al. .............. 701/211 |
| 2006/0097858 | A1* | 5/2006 | Kumabe et al. ............ 340/435 |
| 2006/0182313 | A1* | 8/2006 | Miyahara .................... 382/106 |
| 2006/0215020 | A1* | 9/2006 | Mori et al. .................. 348/119 |
| 2006/0287826 | A1* | 12/2006 | Shimizu et al. ............. 701/216 |
| 2007/0067089 | A1* | 3/2007 | Yoshida ..................... 701/96 |
| 2007/0198189 | A1 | 8/2007 | Herbin et al. |
| 2007/0233343 | A1* | 10/2007 | Saito et al. ................. 701/41 |
| 2007/0255480 | A1* | 11/2007 | Southall et al. ............. 701/96 |
| 2007/0279493 | A1* | 12/2007 | Edanami ..................... 348/148 |

FOREIGN PATENT DOCUMENTS

| | | | | |
|---|---|---|---|---|
| EP | 1231110 | A2 | 8/2002 | |
| EP | 1470958 | A2 | 10/2004 | |
| FR | 2863091 | A1 | 6/2005 | |
| FR | 2893173 | A1 | 5/2007 | |
| JP | 61249849 | A * | 11/1986 | ............ B60Q 3/04 |
| JP | 63215442 | A | 9/1988 | |
| JP | 11016097 | A | 1/1999 | |
| JP | 2005-41433 | A * | 2/2005 | ............ B60R 21/00 |
| JP | 2005-182753 | A * | 7/2005 | ............ G08G 1/16 |
| JP | 2005-196666 | A * | 7/2005 | ............ G08G 1/16 |
| JP | 2005-326963 | A * | 11/2005 | ............ G08G 1/16 |

OTHER PUBLICATIONS

Holzmann, Frederic et al., "Improvement of Driving Safety Using a Virtual Driver," in particular Section IV, A and B; Daimler Chrysler AG, Truck Product Creation—Ecole Polytechnique de Lausanne—Technical University of Munich, 2005.

Kruse, Frank et al., "Object Classification With Automotive Radar," Technical University of Hamburg—Harburg, Dpt of Telecommunications—Volkswagen AG, Research Electronic Systems, Sep. 16, 2004.

Viola, Paul et al., "Rapid Object Detection Using a Boosted Cascade of Simple Features," Accepted Conference on computer vision and pattern recognition, 2001.

* cited by examiner

METHOD OF DETERMINING THE PASSAGE OF A VEHICLE THROUGH A GAP

BACKGROUND OF THE INVENTION

1. Field of the Invention

The invention discloses a method of determining the ability of a vehicle to pass through a restricted gap in the roadway and a system of assisting the vehicle's driver for this purpose.

It finds particular application in the field of motor vehicles.

2. Description of the Related Art

While a vehicle is being driven, there is likelihood that a restricted gap may be encountered on the roadway in the direction of travel. A gap of this type in the roadway may be, for example, a narrowing at road works, a tunnel, restricted headroom under a bridge or a parking space. The restriction may be formed by a limited width of the roadway and/or limited headroom and/or restricted length.

It was oftentimes difficult to determine whether the vehicle is able to pass through the restricted gap in the roadway without damage.

There is, therefore, a need for an improved system and method for determining whether the vehicle is able to pass through a restricted gap in a roadway.

SUMMARY OF THE INVENTION

The object of the present invention is to provide a method and an associated driver assistance system making it possible to determine whether the vehicle is able to pass through a restricted gap in the roadway without damage.

According to the invention, this object is achieved by a method of determining the ability of a vehicle to pass through a restricted gap in the roadway including the steps of:

detecting a restricted gap in the roadway,
defining an image of the vehicle, and
comparing the vehicle image with the restricted gap.

A method of this type has the advantage of making it possible to determine in a simple manner whether the vehicle will pass through the gap. It thus avoids damage to the vehicle or, more seriously, avoids accidents. Furthermore, it provides a means of assisting a user of the vehicle to maneuver the vehicle.

In a non-limitative embodiment, comparison of the vehicle image with the gap is automatic. This is faster than a comparison made by the vehicle driver and allows the driver to react more rapidly when a restricted gap is encountered in the roadway. In addition, it avoids the driver having to make a manual comparison.

In a non-limitative embodiment, the gap is represented on a display and an image of the vehicle is shown in the plane of the image and on a dimensional scale commensurate with the size of the gap, so that a comparison of the gap with the vehicle image can be made to visually determine whether the vehicle can pass through the gap without damage.

Thus, if the dimensions of the vehicle image are smaller than the clearance dimensions of the gap, the vehicle can pass there through without damage. The means providing the image then determine whether the vehicle is able at a later time to pass without damage through the gap located further ahead at the time of the comparison.

In a non-limitative embodiment, the restricted gap shown on the display forms part of an image of the environment recorded by means of a camera. In this image of the environment shown on the display, the vehicle image is projected so that it corresponds, in the plane of the image of the gap, to the dimensional scale of the latter.

In a non-limitative embodiment, when the comparison is made by the driver of the vehicle, to project the vehicle image in the gap on the display, the plane of the image and the position of the vehicle image are manually adjustable on the display so that the vehicle image can be moved to the location of the gap. To make this adjustment, the driver can use manually-operated means, for example sliding, rotary and push button switches. The driver can also re-position the image on the display to the appropriate location of the gap and, once there, can then modify the dimensional scale so that the dimensional scale of the vehicle image corresponds to the gap or to its environment.

In a non-limitative embodiment, the position and the plane of the vehicle image are automatically transferred on the display to the location of the gap. By virtue of this, manual movement of the vehicle image on the display can be dispensed with.

When the vehicle image on the display is moved to the location of the gap and the dimensional scale is adjusted accordingly, it can be determined whether the vehicle is able to pass through the gap without damage.

In a non-limitative embodiment, the gap is fixed in the display. This avoids the gap moving at the same time as the vehicle is moving.

In a non-limitative embodiment, the vehicle image is sized in relation to a speed of the vehicle and a projection distance, the latter being the distance between the front of the vehicle and the image. This enables the driver to ascertain how his/her position is changing in relation to the gap.

In a non-limitative embodiment, the vehicle image is defined in relation to a model of the vehicle. Thus, the exact dimensions of the vehicle are taken into account during the comparison between the image and the gap. The comparison is thus more precise.

In a non-limitative embodiment, in the case where the vehicle image and zones delineating the gap (for example a tunnel entrance, bridge support and/or road works barrier) overlap, a warning signal is emitted. This serves to warn the driver that the vehicle is unable to pass through.

In a non-limitative embodiment, the vehicle image is represented by the outline of the vehicle and/or a line depicting its outline. If a line or a semi-transparent image is provided, the advantage is that the zone situated within the vehicle outline thus depicted is not masked on the display.

In a non-limitative embodiment, to correctly adjust the size of the vehicle image in the gap, provision can be made to show in the bottom part of the display a travel path of the vehicle towards the vehicle image.

It extends in particular along the roadway, up to the vehicle image, the width of the travel path corresponding in particular to the width of the vehicle image (taking into account the width of the wheels) in the respective plane of the image. If the travel path is shown in the form of a bar, this bar becomes narrower in perspective from the bottom edge of the image up to the vehicle image. With the aid of the travel path depicted on the display, it is then possible to obtain a correct dimensional scale of the vehicle in the plane of the image or to the position of the gap. To set the correct dimensional scale, the travel pathway can be selected along the roadway, the bottom edge of the vehicle image being adjusted to the height of the gap.

In a non-limitative embodiment, it is possible that the width and/or height of the vehicle are made visible for a user of the vehicle in the direction of travel in front of the vehicle by means of light sources disposed on the vehicle. By virtue of this, the driver is able, by observing the environment in front of him and/or the display, to determine where the vehicle will go if it continues in the same direction or if it is possible to pass through the gap in the direction taken. Consequently, the driver is guided even more effectively and the risk of collision when passing though the gap is reduced. The light sources can in particular emit colored light.

In a non-limitative embodiment, it is possible to arrange for the light sources to transmit along the roadway and/or to project onto the roadway two lines delineating the width and/or height of the vehicle.

The foregoing object is also achieved by a driver assistance system implementing the method according to the invention, including:
  a camera to record the environment,
  an evaluation unit, this unit including:
    image analysis means to detect a restricted gap in the roadway,
    means of comparing the gap with an image of the vehicle, and
  a display.

In a non-limitative embodiment, a reproduction of the recorded environment and an image of the vehicle are shown on the display.

In a non-limitative embodiment, the assistance system additionally includes manually-operated adjustment means and/or an automatic adjustment unit to adjust the position and the plane of the vehicle image and to re-position the vehicle image on the display.

In a non-limitative embodiment, the assistance system additionally includes light sources such that the width and/or height of the vehicle are made visible for a user of the vehicle.

These and other objects and advantages of the invention will be apparent from the following description, the accompanying drawings and the appended claims.

BRIEF DESCRIPTION OF THE DRAWINGS

Other characteristics and advantages of the invention will be better understood by reference to the description and the non-limitative figures in which.

DESCRIPTION OF THE PREFERRED EMBODIMENTS

Figure 1:
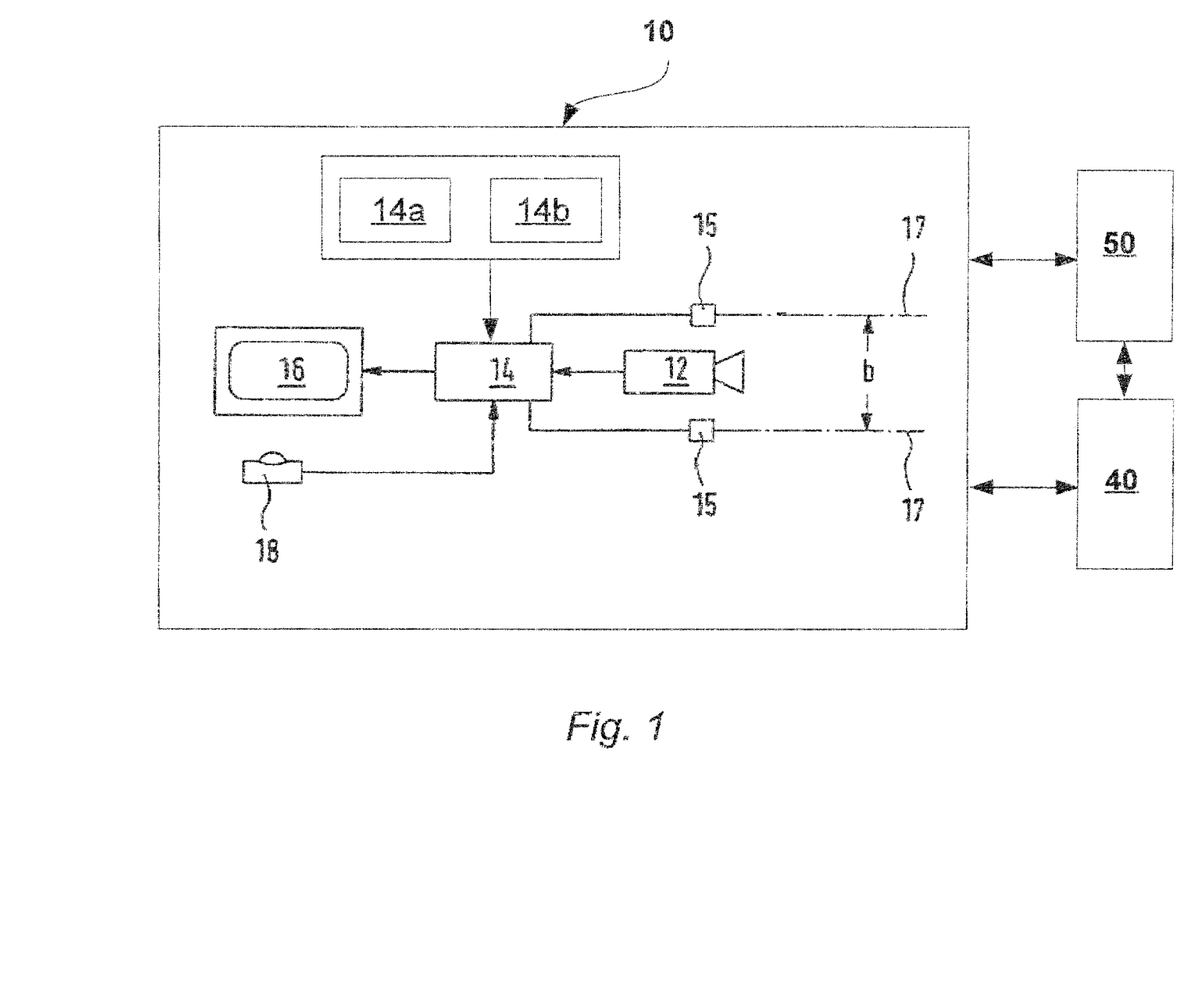
FIG. 1 is a schematic representation of a driver assistance system according to the invention.

The driver assistance system 10 depicted schematically in FIG. 1 includes:
  a camera 12,
  an evaluation unit 14, this unit including:
    image analysis means or image analyzer 14a to detect a restricted gap in the roadway through which the vehicle needs to pass,
    comparator means or a comparator 14b for comparing the gap with an image of the vehicle, and
  a display 16.

In a non-limitative embodiment, the system 10 additionally includes:
  two light sources 15, and
  adjustment means or adjustment 18 operated by the vehicle user, which by way of non-limitative examples can be tactile switches of the sliding, rotary or pushbutton type such as a rotary button and/or a trackball, connected to the evaluation unit 14.

In a non-limitative embodiment, the comparison means 14b include an automatic adjustment unit to adjust the position and the plane of a vehicle image on the display 16 and to move the vehicle image to the location of the gap.

As will be seen in detail below, an image (which may also be referred to as a profile) of the vehicle will be defined and subsequently compared to a restricted gap in the roadway that has been previously detected. This image takes into account at least one dimension (width/height/length) of the vehicle and the comparison is made between at least one vehicle dimension and the gap depending on the type of restriction in the roadway (road, tunnel, bridge, parking space, etc.). For example, if the restriction is a bridge, the height of the vehicle is taken into account, if the restriction is a tunnel, the height and the width of the vehicle are taken into account, and if the restriction is a parking space, the length of the vehicle may also be taken into account. As will be seen, this image and the gap may or may not be displayed on the display 16.

The vehicle environment located ahead of the vehicle in the direction of travel is recorded by the camera 12.

The description below can also apply in the reverse direction of travel.

This recorded environment can be shown on the display 16. When the environment is thus displayed, both light sources 15 (illustrated schematically in FIG. 1) emit two lines 17 delineating the width of the vehicle b along the roadway. These lines 17 are visible for the driver of the vehicle by observing the environment in the direction of travel. Where appropriate, the light sources 15 can be designed so that the lines 17 emitted thereby are visible on the display 16 for the driver. In particular, laser light sources can be used as the light sources 15. The light sources 15 can in particular be mounted in the housing of each headlamp. Other types of sources can of course be used.

Figure 2:
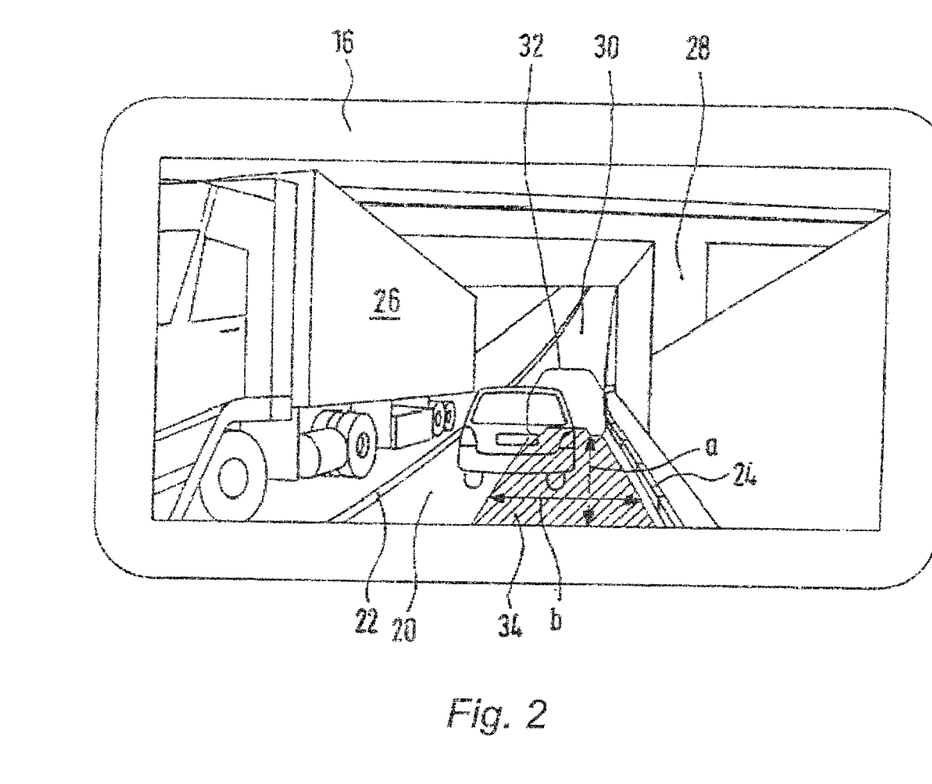
FIG. 2 illustrates a first example of a display generated by the system according to FIG. 1.
Figure 3:
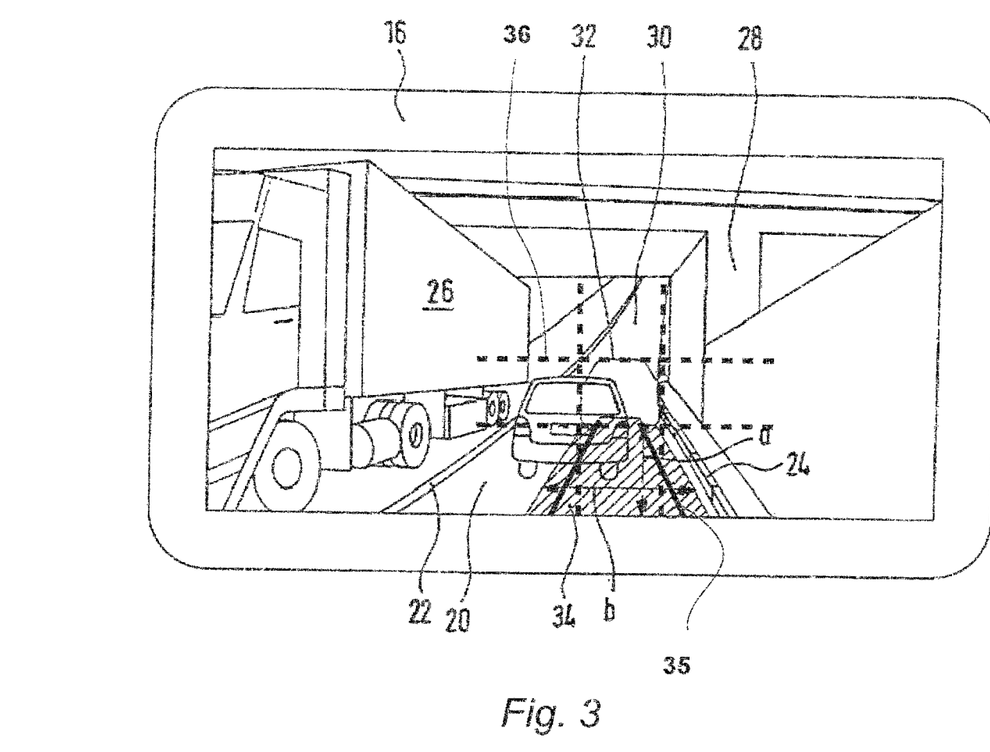
FIG. 3 illustrates a second example of a display generated by the system according to FIG. 1.
Figure 4:
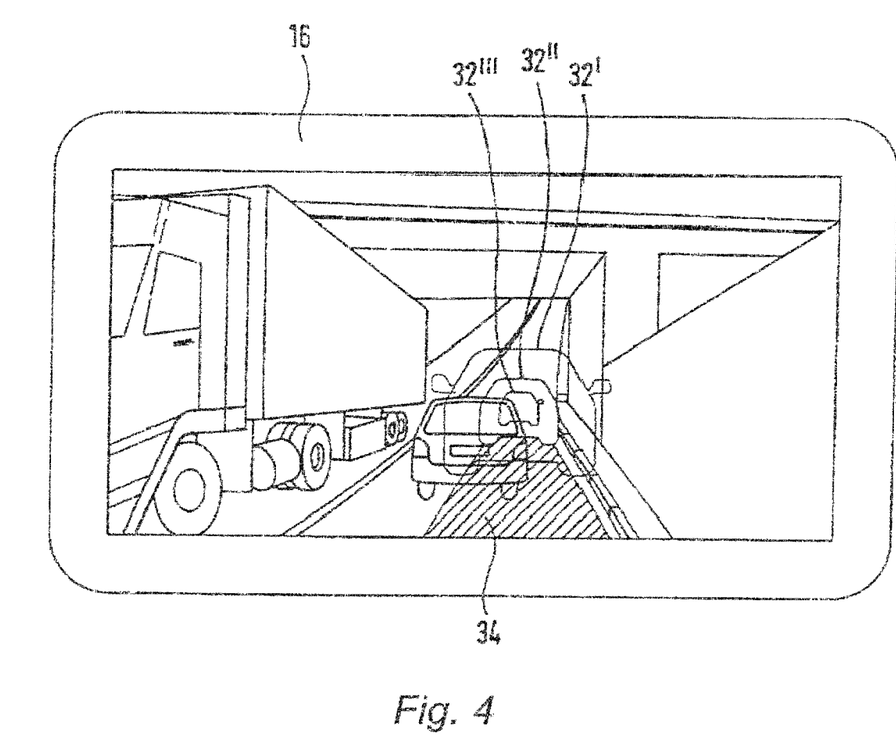
FIG. 4 illustrates a third example of a display generated by the system according to FIG. 1.

FIGS. 2, 3 and 4 illustrate for example an image of the environment recorded by the camera 12. The image of the environment shows the roadway 20, the path of the vehicle being delineated on the left-hand side by a median line 22 and on the right-hand side by a pavement 24. Oncoming traffic 26 is traveling in the opposite lane. As can be seen on the display image, the vehicle is approaching an underpass which is restricted on its right-hand side by bridge supports 28. The area between the bridge support 28 and the oncoming traffic 26 represents a restricted gap in the roadway 30. The gap is detected and determined by the image analysis means 14a. In a first non-limitative example, such image analysis means 14a are described in the document "Rapid Object Detection Using a Boosted Cascade of Simple Features—P. Viola—Mitsubishi Electric Research Labs, M. Jones—Compaq CRL—Conference on computer vision and pattern recognition 2001". A second non-limitative example of such analysis means is described in patent application FR 05 11 488, which was published as French Patent Application No. 2893173, which is equivalent to U.S. Patent Publication No. 2007/0198189, all of which are incorporated herein by reference and made a part hereof.

The driver assistance system 10 makes it possible to determine whether the vehicle is able to pass through the restricted gap 30 in the roadway 20 without damage.

To this end, in a first non-limitative embodiment, the display 16 depicts, as shown in FIGS. 2, 3 and 4, an image 32 of the vehicle in which the driver is located.

In a first variant, the image 32 is in the form for example of a solid line representing the outline of the vehicle viewed from the rear or from the front. Another shape more basic than the vehicle outline may of course be used, such as a square or a parallelepiped. It will be noted that it is also possible to represent the length of the vehicle by means of the image 32.

A travel path 34 depicted in graphical form in the Figures, extending along the roadway 20, in the direction of the vehicle image 32, is shown in the bottom area of the display 16. The width b of the travel path 34 corresponds to the width of the vehicle image 32 in the plane of the respective image (taking into account the width of the wheels). By reason of the perspective representation, the width b becomes narrower in relation to the location of the plane of the associated image. The distance a, shown in FIG. 2, from the bottom edge of the display image to the bottom edge of the vehicle image 32 corresponds to the distance of the vehicle in relation to the restricted gap 30.

On the image of the environment recorded by the camera 12, shown in FIGS. 2, 3 and 4, the restricted gap 30 is situated in front of the vehicle in the direction of travel. The travel path 34 therefore also extends in a straight line in the direction of travel. The lines 17 are not shown on the display 16 in FIG. 2. In the case where the lines 17 emitted by the light sources 15 are shown on the display 16, these lines 17 will delimit the travel path 34 in the situation represented by the display 16. If the restricted gap 30 in the roadway 20 is not located in a straight line in the direction of travel ahead of the vehicle, the lines 17 will not overlie the lines of delimitation of the travel path 34, but will present another direction.

It is also possible to represent trajectories 35 corresponding to the steering angle of the wheels as shown in FIG. 3 as a solid bold line. These trajectories 35 are represented by lines depicting the path of the wheels projected as far as the restricted gap 30. The fact of showing the wheel trajectories enables a driver to park more easily, for example, when he wishes to maintain a distance between vehicles, or to drive more easily on a winding road. The driver is thus able detect and avoid obstacles on the wheel trajectory or to work out an overlap. It will be noted that the wheel trajectories are not necessarily parallel to the travel path 34.

It will be noted that the trajectories 35 can be adjusted by taking into account the steering angle. The latter is given for example by a sensor and computed for example relative to the vertical axis of the vehicle. At this moment, it is referred to as the yaw angle. The lines representing the trajectories 35 may therefore be curved lines rather than straight lines.

The trajectories 35 can be divided into two types, one for the front wheels, and one for the rear wheels. This makes it possible to take account of the turning radius which is different for these two types of wheels.

The vehicle image 32 shown in FIG. 2 or 3 can be repositioned and its size adjusted on the display 16 using the manually-operated adjustment means 18. Repositioning can be effected continuously or gradually in a series of steps. Thus, it is possible to move the vehicle image 32 to the position of the restricted gap 30 in the roadway 20 and to adjust the dimensional scale so that the dimensional scale of the image 32 matches that of the restricted gap 30 shown and is located in its image plane.

To assist the driver to reposition the vehicle image 32 on the travel path 34, use may also be made of placement aids such as vertical and horizontal lines 36 extending on either side of the vehicle image 32, as shown in FIG. 3 as bold dotted lines.

FIG. 4 shows a combination of three different dimensional scales of the images 32, which are located in three different image planes. The largest vehicle image 32' shown is located in the image plane as the vehicle enters the underpass. The middle-sized vehicle image 32" shown corresponds to the dimensional scale of the vehicle inside the underpass. The third and smallest representation of the vehicle image 32'" corresponds to the dimensional scale of the vehicle as it is leaving the underpass and is located in the associated image plane.

It will be noted that the position of the restricted gap 30 through which the driver wishes to pass is preferably fixed in the display 16. Thus, according to whether the vehicle is moving forward or reversing in the direction of the restricted gap 30, the image 32, 32', 32" of the vehicle adapts to the image of the restricted gap 30, and the latter does not move on the display 16.

It will be further noted that the size of the vehicle image 32 can be adapted in relation of a projection distance d2 and the speed of the vehicle Vit. Thus, the travel path 34 is set at the precise initial distance a between the vehicle and the restricted gap 30 in the roadway 20. Taking into account the speed of the vehicle Vit, and multiplying it by the travel time T, a travel distance d1 and a projection distance d2 equal to the initial distance a less the distance d1 is obtained. The vehicle image 32 is thus re-sized so that it increases in size as the vehicle approaches the restricted gap 30 in the roadway 20. A correspondence is thus established between the size of the vehicle image 32 and the projection distance d2, the projection distance being the distance between the front of the vehicle and the image 32. Such a correspondence between different sizes of the image 32 and different values of the projection distance d2 can be stored in memory in the vehicle.

It will also be noted that it is possible to set the projection distance d2, either to a minimum and/or to a maximum, for example at the factory.

Figure 5:
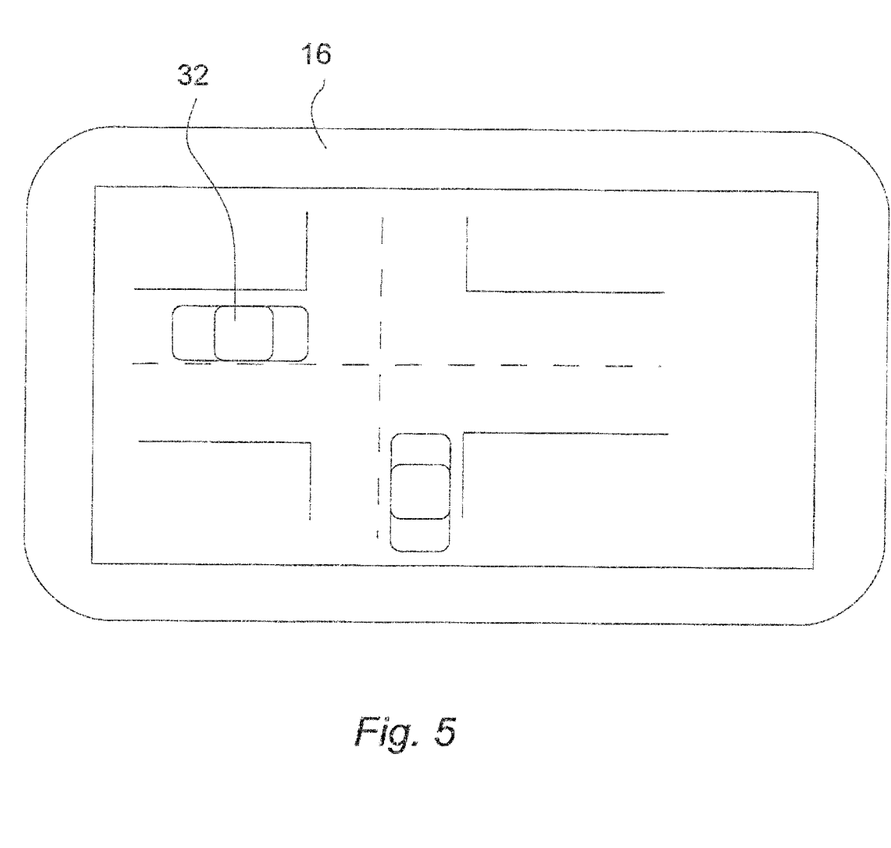
FIG. 5 illustrates a fourth example of a display generated by the system according to FIG. 1.

In a second non-limitative variant of this first embodiment, the display 16 shows, as illustrated in FIG. 5, an aerial view image 32 of the vehicle in which the driver is located, together with its environment. This type of display 16 is referred to as a "bird's eye view" and is described in a non-limitative example in the document "Improvement of driving safety using a virtual driver—F. Holzmann, et al—Daimler Chrysler AG, Truck Product Creation—Ecole Polytechnique de Lausanne—Technical University of Munich", and in particular in Section IV A and B. Such a display 16 makes it possible to check the length/width of the vehicle relative to a restricted gap 30, such as for example a parking space, or may be used simply to show oncoming or cross traffic, and to check that the vehicle does not overshoot the road at a junction, as illustrated in FIG. 5. This type of view is thus also suited in particular to warning the driver of dangers arising at the side of the vehicle. For example, if the driver's maneuvering strategy is inappropriate for entering a parking space, a warning signal can be displayed such as for example a red indicator on the side of the vehicle where there may be a danger.

Other types of view can of course be used, such as a 3D view of the vehicle.

Consequently, comparison of the vehicle image 32 with the internal width of the restricted gap 30 shown in the corresponding image plane makes it possible to determine whether the vehicle is able to pass through the restricted gap 30 without damage. The driver can make this comparison in particular by observing the vehicle image 32 and the restricted gap 30 on the display 16.

In a second more perfected embodiment, this comparison can be performed automatically by means of the evaluation unit 14, by the image analysis means 14a which detect the restricted gap 30, and by the comparison means 14b. Appropriate processing of the image makes it possible to compute the inside width of the restricted gap 30 and to compare the vehicle image 32 with the respective image plane. In another variant, the comparison is made by positioning both respective images 32 of the vehicle and the restricted gap 30 in the same plane to make the comparison (by adjusting for example the position and the plane of the vehicle image 32 and by moving it to the location of the restricted gap 30).

In this case, the comparison is not made by the driver.

The display 16 need not therefore display either the image 32 of the vehicle or the image of the restricted gap 30. A visual signal can be generated on the display 16 to tell the driver if he can pass through without damage. Also, the display 16 need not be active. At this time, another interface can be used such as an audible and/or tactile interface (not shown) to tell the driver if he can pass through without damage. It is thus perfectly possible to have a camera 12 including video sensors without having a visual interface.

Of course, a third embodiment can be provided wherein the comparison is automatic, while the display 16 still shows the vehicle image 32, the restricted gap 30 and the environment. This is performed by virtue of the automatic adjustment unit of the comparison means 14b which makes is possible to adjust the position and the plane of a vehicle image 32 on the display 16 and to move the vehicle image 32 to the location of the restricted gap 30.

Thus, if it is determined (visually by the driver and/or by the emission of an optical and/or audible signal and/or tactile signal) that the vehicle can pass through the restricted gap 30 without damage, the driver can concentrate on what is happening ahead and drive in an appropriate manner through the restricted gap 30.

It will be noted that this is facilitated by the lines 17 in that the driver is informed as to whether the direction of travel he has taken is correct in order to pass through the restricted gap 30 without damage. He is therefore able to concentrate on what is happening in front of the vehicle, taking account of the lines 17, and turn his attention away from the display 16. The lines 17 therefore help the driver to pass through the restricted gap 30 without damage. The light sources 15 can in particular emit a colored light which stands out from the environment and is dearly visible to the driver. Similarly, the lines 17 can be shown in color on the display 16.

In the case where it is not possible to pass through the restricted gap 30 without damage, a warning signal can be also given to the driver. The warning signal given to the driver in case of overlap can be optical, audible or tactile. For example, an acoustic signal can be emitted or warning symbols can appear on the display 16, such as "proceed", "proceed slowly", "do not proceed", etc. Other driver assistance systems can also be activated, in particular automatic braking of the vehicle can be initiated in case of imminent collision.

It is also possible that other driver assistance systems, to activate forced turning and/or forced braking for example, can be linked to the warning signal.

It will be noted that, in a general manner, in order to determine the vehicle image 32 (whether or not it is shown on the display 16), the parameter used is the vehicle model which makes it possible to have the exact dimensions of the vehicle. Thus, the vehicle model is stored in memory in the vehicle, either at the factory or retrofitted.

In addition, parameters such as for example the width of the doors or the length of the tailgate can also be used to determine, in particular when the vehicle is stationary, whether it is possible to open the doors or tailgate when the vehicle is positioned in a restricted gap 30 in the roadway 20 such as a parking space. The vehicle model can be recorded at the factory or retrofitted.

Other parameters can also be taken into account such as the presence of bicycles on the roof or a detachable roof rack. These parameters can be stored in memory, at the initiative of the vehicle user, via a suitable interface (for example on startup of the driver assistance system 10), or automatically by means of presence sensors for example.

In a non-limitative embodiment, the driver assistance system 10 can cooperate with an obstacle detection system 40 such as that illustrated in FIG. 1. This obstacle detection system 40 serves to determine whether there is an obstacle on the travel path 34, i.e. between the vehicle and the restricted gap 30, and the nature of the obstacle (vehicle, motorcycle, etc.) and whether the obstacle is moving or stationary. Such a system is based for example on one or more sensors (vision, radar, ultrasound, laser etc.) well known to the person skilled in the art, and/or on the combination of data generated by these sensors. A non-limitative example of an obstacle detection system 40 using a radar sensor is described in the document "Object classification with automotive radar—F. Kruse, F. Folster, M. Ahrholdt, M M. Meinecke, H. Rohling—Technical University of Hamburg-Harburg, Dpt of Telecommunications—Volkswagen AG, Research Electronic Systems". Another non-limitative example of an obstacle detection system 40 using another type of sensor is described in the document "Vehicle Detection and Compass Applications using AMR Magnetic Sensors—M J. Caruso, L S. Withanawasam—Honeywell, SSEC" and in particular in the sections on AMR Sensor Applications and Vehicle Classification.

The obstacle detection system is either automatic or semi-automatic. In the latter case, a suitable interface enables the vehicle user to define the obstacle himself.

Thus if such an obstacle, such as a car for example, is present in the travel path 34, a signal is emitted (audible, visual, etc.) to warn the driver not to proceed.

In a non-limitative embodiment, the driver assistance system 10 can also cooperate with on-board systems 50 in the vehicle, such as side mirror controls, so as to automatically control these systems. For example, if the driver wishes to park in a narrow parking space, the driver assistance system 10 detects that the space is too narrow and can emit a warning signal as seen previously, but can also automatically fold away a side mirror if this is sufficient to enter the parking space. The same applies to the obstacle detection system 40 which can also cooperate with on-board systems 50.

These automatic controls can be an option to be activated by the driver via a suitable interface. It is also possible to apply this automatic control to the doors or tailgate of the vehicle, or to gradual actuation of the brake pedal or automatic parking systems.

Thus, the driver assistance system 10 can be used in the case where the vehicle is moving (in forward or reverse, on the road or when the driver wishes to park in a parking space for example), and also in the case where the vehicle is stationary (for example when a user of the vehicle wishes to open a door). It thus makes it possible to avoid accidents and damage to the vehicle, and also serves to assist the driver in correctly maneuvering his vehicle.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of determining the ability of a vehicle to pass through a restricted gap in a roadway, said method comprising the steps of:
   detecting the restricted gap in said roadway using a camera and generating an image of said restricted gap in response thereto, said restricted gap being an area between at least two objects and said image of said restricted gap being an image captured in a direction of travel of said vehicle;
   defining a vehicle image of said vehicle;
   comparing said vehicle image with said image of said restricted gap using an evaluation unit;
   determining a projection distance between said vehicle and said restricted gap and using said projection distance to dimensionally re-size and scale said vehicle image to provide a scaled image of said vehicle relative to said image of said restricted gap; and
   simultaneously displaying on a display said scaled vehicle image and said image of said restricted gap to enable a driver to determine whether said vehicle can pass through said restricted gap;
   wherein said image of said restricted gap is fixed on said display and said scaled image of said vehicle adapts and is scaled to said image of said restricted gap, while said image of said restricted gap on said display does not move;
   wherein the method further comprises the steps of:
      using said projection distance to dimensionally re-size and scale said vehicle image to provide a scaled image of the said vehicle relative to said image of said restricted gap; and
      fixing said image of said restricted gap on said display and adapting said scaled image of said vehicle to said image of said restricted gap, while said image of said restricted gap on said display does not move;
   said scaled vehicle image being overlaid on said image of said restricted gap so that a dimensional scale of said scaled vehicle image of said vehicle matches a scale of the restricted gap and is located in its image plane.

2. The method according to claim 1, wherein comparison of said vehicle image with said restricted gap is automatic.

3. The method according to claim 1, wherein said restricted gap and said vehicle image are represented on a display in a manner such that comparison of said restricted gap represented with said vehicle image makes it possible to determine whether said vehicle can pass through said restricted gap without damage.

4. The method according to claim 1, wherein said restricted gap represented on a display forms part of a recorded image of an environment.

5. The method according to claim 1, wherein a position and a plane of said vehicle image are manually adjustable on a display to move said vehicle image to a location of said restricted gap.

6. The method according to claim 1, wherein a position and a plane of said vehicle image are moved automatically on a display situated in said vehicle to a location of said restricted gap.

7. The method according to claim 1, wherein said restricted gap is fixed in a display situated in said vehicle.

8. The method according to claim 1, wherein said vehicle image is sized in relation to a speed of said vehicle and a projection distance, the latter being a distance between a front of said vehicle and said vehicle image.

9. The method according to claim 1, wherein said vehicle image is defined in relation to a vehicle model.

10. The method according to claim 1, wherein, in case of overlap of said vehicle image and zones delineating said restricted gap, a warning signal is emitted.

11. The method according to claim 1, wherein said vehicle image is represented by at least one of an outline of said vehicle or a line depicting its outline.

12. The method according to claim 1, wherein a travel path running towards said vehicle image is shown in a bottom part of a display situated in said vehicle.

13. The method according to claim 1, wherein at least one of a width or height of said vehicle is made visible for a user of said vehicle in a direction of travel in front of said vehicle by means of light sources disposed on said vehicle.

14. The method according to claim 1, wherein light sources project onto said roadway two lines delimiting a width and/or height of said vehicle.

15. A driver assistance system for implementation of said method according to claim 1, including:
   a camera to record an environment,
   an evaluation unit, said evaluation unit comprising:
      an image analyzer that detects a restricted gap in a roadway,
      a comparator that compares said restricted gap with an image of a vehicle, and
   said vehicle on a display.

16. The driver assistance system according to claim 15, in which a reproduction of a recorded environment and said image of said vehicle are represented on said display.

17. The driver assistance system according to claim 15, additionally including an automatic adjustment unit that adjusts a position and a plane of said image of said vehicle on said display and to move said image of said vehicle to a location of said restricted gap.

18. The driver assistance system according to claim 15, additionally including light sources to render at least one of a width or a height of said vehicle visible for a user of said vehicle.

19. The method according to claim 1, wherein said method further comprises the step of:
   generating a warning to a driver if a comparison shows that said restricted gap is smaller than acceptable.

20. The driver assistance system according to claim 15, wherein said driver assistance system further comprises:
   an alarm to the driver for generating a signal if a comparison of said restricted gap with said image of said vehicle establishes that said vehicle will not fit through said restricted gap.

21. A system for determining the ability of a vehicle to pass through a restricted gap in a roadway, said system comprising:
   a camera for detecting the restricted gap in said roadway to generate an image of said restricted gap in response thereto, said restricted gap being an area behind at least two objects and said image of said restricted gap being an image captured in a direction of travel of said vehicle;
   an evaluation unit that compares a vehicle image of the vehicle with said image of said restricted gap;
   said evaluation unit determining a projection distance between said vehicle and said restricted gap and using said projection distance to dimensionally re-size and scale said vehicle image to provide a scaled image of said vehicle relative to said image of said restricted gap; and
   a display for simultaneously displaying said scaled vehicle image and said image of said restricted gap to enable a driver to determine whether said vehicle can pass through said restricted gap in response to said comparison;

wherein said image of said restricted gap is fixed on said display and said scaled image of said vehicle adapts and is scaled to said image of said restricted gap, while said image of said restricted gap on said display does not move;

wherein said evaluation unit uses said projection distance to dimensionally scale and re-size said vehicle image to provide a scaled image of the said vehicle relative to said image of said restricted gap and then fixes said image of said restricted gap on said display and adapts said scaled image of said vehicle to said image of said restricted gap, while said image of said restricted gap on said display does not move;

said scaled vehicle image being overlaid on said image of said restricted gap so that a dimensional scale of said scaled vehicle image of said vehicle matches a scale of the restricted gap and is located in its image plane.

22. The system according to claim 21, wherein evaluation unit compares said vehicle image with said image of said restricted gap automatically.

23. The system according to claim 21, wherein said restricted gap and said vehicle image are represented on said display in a manner such that comparison of said restricted gap represented with said vehicle image makes it possible to determine whether said vehicle can pass through said restricted gap without damage.

* * * * *

UNITED STATES PATENT AND TRADEMARK OFFICE
CERTIFICATE OF CORRECTION

PATENT NO.       : 8,854,462 B2            Page 1 of 1
APPLICATION NO.  : 11/834145
DATED            : October 7, 2014
INVENTOR(S)      : Anne Herbin et al.

It is certified that error appears in the above-identified patent and that said Letters Patent is hereby corrected as shown below:

In the Specification

Column 3, line 66, before "system" insert --driver assistance--.

Column 4, line 4, delete "pushbutton" and insert --push button-- therefor.

Column 4, line 49, after first occurrence of "gap" insert --30--.

Column 4, line 49, after "roadway" delete "30" and insert --20-- therefor.

Column 4, line 49, before second occurrence of "gap" insert --restricted--.

Column 4, line 49, after second occurrence of "gap" insert --30--.

Signed and Sealed this
Twenty-second Day of March, 2016

Michelle K. Lee
*Director of the United States Patent and Trademark Office*